United States Patent
Kim et al.

(10) Patent No.: US 8,503,404 B2
(45) Date of Patent: Aug. 6, 2013

(54) UPLINK SYNCHRONIZATION REQUEST METHOD IN MOBILE COMMUNICATION SYSTEM, CDMA ALLOCATION IE THEREOF, AND APPARATUS USING THE SAME

(75) Inventors: Sung-Kyung Kim, Daejeon (KR); Kwang-Jae Lim, Daejeon (KR); Chul-Sik Yoon, Seoul (KR); Jee-Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 752 days.

(21) Appl. No.: 12/304,672

(22) PCT Filed: Mar. 20, 2007

(86) PCT No.: PCT/KR2007/001357
§ 371 (c)(1),
(2), (4) Date: Dec. 12, 2008

(87) PCT Pub. No.: WO2007/145419
PCT Pub. Date: Dec. 21, 2007

(65) Prior Publication Data
US 2009/0190560 A1 Jul. 30, 2009

(30) Foreign Application Priority Data

Jun. 14, 2006 (KR) .................. 10-2006-0053502
Dec. 8, 2006 (KR) .................. 10-2006-0124572

(51) Int. Cl.
*H04B 7/216* (2006.01)
*H04J 3/06* (2006.01)
(52) U.S. Cl.
USPC .......................................... 370/335; 370/350
(58) Field of Classification Search
USPC ................................................... 370/335
See application file for complete search history.

(56) References Cited

U.S. PATENT DOCUMENTS 6,922,388 B1 7/2005 Laroia et al.
6,967,936 B1 * 11/2005 Laroia et al. .................. 370/329
(Continued)

FOREIGN PATENT DOCUMENTS

EP 1 170 881 1/2002
EP 1 458 210 9/2004
(Continued)

OTHER PUBLICATIONS

IEEE Std 802.16e , Part 16: Air Interface for Fixed and Mobile Broadband Wireless Access Systems. Amendment2: Physical and Medium Access Control Layers for Combined Fixed and Mobile Operation in Licensed Bands. and Corrigendum 1, Feb. 28, 2006.*

(Continued)

*Primary Examiner* — Derrick Ferris
*Assistant Examiner* — Majid Esmaeilian
(74) *Attorney, Agent, or Firm* — Staas & Halsey LLP

(57) ABSTRACT

The present invention relates to an uplink synchronization request method in a mobile communication system, a CDMA allocation information element structure thereof, and an apparatus using the same. For this purpose the uplink synchronization request method includes: when uplink traffic is generated, determining whether an uplink synchronization error occurs; when the uplink synchronization error occurs, calculating a timing adjustment value; and transmitting a bandwidth request code including the calculated timing adjustment value to a base station and performing a bandwidth request. According to the present invention, the PSS compares a reference adjustment value and an arrival time of a downlink preamble to calculate uplink synchronization timing and synchronize an uplink of the PSS that requests bandwidth allocation through a bandwidth request ranging process to thereby maximize resource use efficiency in the uplink synchronization.

10 Claims, 8 Drawing Sheets

U.S. PATENT DOCUMENTS

| | | | |
|---|---|---|---|
| 7,310,303 | B2 | 12/2007 | Koo et al. |
| 7,450,541 | B2 | 11/2008 | Fernandez-Corbaton et al. |
| 2004/0194109 | A1* | 9/2004 | Boros et al. .................. 718/107 |
| 2006/0058051 | A1 | 3/2006 | Takano et al. |
| 2006/0203712 | A1* | 9/2006 | Lim et al. ...................... 370/208 |

FOREIGN PATENT DOCUMENTS

| | | |
|---|---|---|
| GB | 2 389 013 | 11/2003 |
| JP | 2003-318859 | 11/2003 |
| KR | 10-0129142 | 11/1997 |
| KR | 10-2001-0082061 | 8/2001 |
| KR | 10-2004-0090736 | 10/2004 |
| KR | 10-2006-0066408 | 6/2006 |
| KR | 10-0600674 | 7/2006 |
| KR | 10-2006-0116254 | 11/2006 |
| WO | 2006/062285 A1 | 6/2006 |

OTHER PUBLICATIONS

NPL document IEEE 802.16e Part 16: Air Interface for Fixed and Mobile Broadband Wireless Access Systems, dated Feb. 28, 2006.*

International Search Report and Written Opinion of the International Searching Authority issued on Jun. 25, 2009 in corresponding International Patent Application No. PCT/KR2007/001357.

IEEE Computer Society and the IEEE Microwave Theory and Techniques Society, Amendment 2: Physical and Medium Access Control Layers for Combined Fixed and Mobile Operation in Licensed Bands and Corrigendum 1, IEEE Standard for Local metropolitan area networks Park 16: Air Interface for Fixed and Mobile Broadband Wireless Access Systems, USA, IEEE, Feb. 28, 2006, IEEE Std 802, 16e.-2005 & IEEE Std. 802.1, p. 184, 185, 195-208, 432, 567-570.

IEEE Computer Society and the IEEE Microwave Theory and Techniques Society; Part 16: Air Interface for Fixed Broadband Wireless Access Systems; Oct. 1, 2004; IEEE Std. 802.16.-2004, p. 141-151, 199-213, 534, 535, 576-579.

Telecommunications Technology Association 2.3GHz Portable Internet Project Group (PG302), 2.3GHz Portable Internet (Wibro) Overview, Mar. 15, 2006.

* cited by examiner

Fig. 7

| | Syntax | Size | Note | |
|---|---|---|---|---|
| 710 | CDMA_Allocation_IE(){ | | | |
| | Duration | 6 bits | | ~711 |
| | UIUC | 4 bits | UIUC for transmission | ~712 |
| | Repetition Coding Indication | 2 bits | | ~713 |
| | Frame Number Index | 4 bits | LSBs of relevant frame number | ~714 |
| | Ranging Code | 8 bits | | ~715 |
| | BW request mandatory | 1 bits | 1 = yes, 0 = no | ~716 |
| 730~ | Transmission Opportunity | 5 bits | | |
| 740~ | Timing adjustment | 8 bits | Unit of 1 sample | |
| 750~ | Power level adjustment | 10 bits | Unit of 0.25dB | |
| | } | | | |

UPLINK SYNCHRONIZATION REQUEST METHOD IN MOBILE COMMUNICATION SYSTEM, CDMA ALLOCATION IE THEREOF, AND APPARATUS USING THE SAME

CROSS REFERENCE TO RELATED APPLICATIONS

This application claims the benefit under 35 U.S.C. Section 371, of PCT International Application Number PCT/KR2007/001357, filed Mar. 20, 2007 and Korean Application Nos. 10-2006-0053502 filed Jun. 14, 2006 and 10-2006-0124572 filed Dec. 8, 2006 in Korea, the contents of all of which are incorporated herein by reference.

TECHNICAL FIELD

The present invention relates to an uplink synchronization request method, a code division multiplexing access (CDMA) allocation information element, and an apparatus using the same. More particularly, a portable subscriber station calculates uplink synchronization timing by comparing a reference adjustment value and an arrival time of a downlink preamble, and requests bandwidth through bandwidth request ranging.

BACKGROUND ART

A wireless portable Internet (i.e., wireless broadband (WiBro) or a high-speed portable Internet) is a next-generation communication system that supports mobility to local data communication methods such as the conventional wireless LAN using a fixed access point.

FIG. 1 is a schematic diagram of a wireless portable Internet system.

As shown in FIG. 1, a wireless portable Internet system includes a portable subscriber station (PSS) 110, a radio access station (RAS) 120, an access control router (ACR) 130, an Internet protocol (IP) network 140, a home agent (HA) 150, an authentication, authorization, and accounting (AAA) server 160, and an Internet 170.

The PSS 110 uses high-speed wireless Internet services by accessing the wireless portable Internet system and receiving/transmitting traffic data, and performs a low-power radio frequency (RF)/intermediate frequency (IF) module and controller function, a function of control variation of a media access control (MAC) frame according to service characteristics and propagation environment, a hand-off function, and an authentication and encryption function.

As a base station of the wireless portable Internet system, the RAS 120 wirelessly transmits data received from the ACR 130 to the PSS 110, and performs a low-power RF/IF module and controller function, an orthogonal frequency division multiplexing access (OFDMA)/time division duplex (TDD) packet scheduling and channel multiplexing function, a function of control variation of a media access control (MAC) frame according to service characteristics and propagation environment, a high-speed traffic real-time control function, and a hand-over function. In addition, the PSS 110 and the RAS 120 respectively have a packet transmission modulation/demodulation function for data transmission, a high-speed packet channel coding function, and a real-time modem control function.

As a packet access router connecting ACRs 120, the ACR 130 includes a plurality of RASs 120 and performs a handover function between the RASs 120 and between ACRs 130, a packet routing function, and an Internet access function, and it accesses the IP network 140.

The IP network 140 is connected with the HA 150 and the AAA server 160, and receives packet data from an external packet data service (i.e., Internet 170) and delivers the received packet data to the ACR 130.

The HA 150 performs routing for transmission of the data to the PSS 110 from the Internet 170 when using a mobile IP, and the AAA server 160 charges the PSS 110 for using data and authenticates access of the PSS 110.

When the PSS 110 transmits uplink data in the wireless portable Internet system, ranging is performed to adjust transmission parameters such as power of the PSS 110, timing, and frequency offset so as to successfully transmit the uplink data to the RAS 120.

The ranging process in the wireless portable Internet is divided into an initial access/handoff ranging process, a periodic ranging process, and bandwidth request ranging using a bandwidth request code.

The initial access/hand-off ranging process is performed for adjusting transmit power, timing, and frequency offset of the PSS 110 and starting an initial signal access process when the PSS 110 initially accesses the RAS 120 or attempts a handoff to the RAS 120.

The periodic ranging process is periodically performed so as to adjust transmit power, timing, and frequency offset of the PSS 110. The transmission parameters vary as the PSS 110 moves.

FIG. 2 is a signal flowchart of the periodic ranging process in the wireless portable Internet system.

The PSS 110 in the wireless portable Internet system determines whether a timer T4 is terminated in order to perform the periodic ranging process. In this case, the timer T4 measures a maximum time interval for at least one allocation of an uplink resource, and checks a periodic ranging interval.

When it is determined in step S210 that the timer T4 is terminated, the PSS 110 transmits a periodic ranging code to the RAS 120, in step S220. In this case, the periodic ranging code is a ranging request signal that is simultaneously transmitted to the RAS 120 from the PSS 110 when the timer T4 is reset so that the timer T4 can perform periodic ranging for every interval of the timer T4.

The RAS 120 adjusts the transmission parameters (e.g., transmit power, timing, and frequency offset) when receiving the periodic ranging code in step S230, and transmits transmission parameter adjustment values to the PSS 110 through a ranging response (RNG_RSP) signal, in step S240.

The PSS 110 adjusts the transmit power, timing, and frequency offset by using the received transmission parameter adjustment values. Such a periodic ranging process is performed for every interval of the timer T4, in step S250.

The ranging process using the bandwidth request code is performed to request a bandwidth for transmission of uplink traffic when the uplink traffic is generated in the PSS 110.

FIG. 3 is a signal flowchart of a bandwidth allocation and ranging process by a bandwidth request code in the wireless portable Internet system.

When uplink traffic is generated in the PSS 110 in step S310, a bandwidth request code is transmitted to the RAS 120 in step S320.

When receiving the bandwidth request code, the RAS 120 generates an RNG_RSP signal including transmission parameter adjustment values (e.g., measured frequency offset, transmit power, and timing) in step S330, and transmits the generated RNG_RSP signal to all PSSs in the RAS 120, in step S340. When receiving the RNG_RSP signal including the transmission parameter adjustment values, the PSS 110 adjusts the transmission parameters (e.g., timing, transmit power, frequency offset) in step S350.

In addition, the RAS 120 transmits code division multiplex access (CDMA) allocation information element (CDMA_Allocation_IE) of an uplink MAP (UL-MAP) in step S360. Herein, the CDMA_Allocation_IE includes an uplink interval usage code (UIUC), a repetition code indicator (RCI), a frame number index, a ranging code, a ranging symbol, a ranging sub-channel, and a bandwidth (BW) request mandatory, and provides radio resource information of the corresponding uplink.

The PSS 110 performs a ranging process through the received CDMA_Allocation_IE, and transmits a bandwidth request header to the RAS 120 by using a bandwidth allocated to the UL-MAP, in step S370. The RAS 120 generates a UL-MAP and an DL-MAP to which bandwidths for uplink traffic transmission of the PSS 110 are allocated through the received bandwidth request header and transmits the UL-MAP and the DL-MAP to the PSS 110 in step S380, and the PSS 110 transmits UL traffic by using the bandwidths allocated to the UL-MAP and DL-MAP, in step S390.

Such a periodic ranging process has a problem of degrading resource use efficiency since the periodic ranging process requires a relatively larger number of ranging channels than the initial access/hand-off ranging process or the bandwidth request ranging. In addition, substantial data transmission timing of the PSS may be delayed even though transmit power is precisely adjusted through the periodic ranging, and accordingly, a power control gain obtained through the periodic ranging may be lower than expected.

In addition, the ranging process using the bandwidth request code as shown in FIG. 3 also causes a delay in uplink traffic transmission since a delay occurs in the receiving of an RNG_RSP message and the processing of the RNG_RSP until the PSS transmits a bandwidth request code and the RAS transmits a bandwidth request header.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for uplink synchronizing of a portable subscriber station by comparing a reference adjustment value with an arrival time of a downlink preamble, calculating uplink synchronization timing, and requesting bandwidth allocation through a bandwidth request ranging process, a CDMA allocation information element structure for the uplink synchronization, and an apparatus using the method.

Technical Solution

An exemplary method according to one embodiment of the present invention requests uplink synchronization in a mobile communication system. The method includes: if uplink traffic is generated, determining whether an uplink synchronization error occurs; calculating a timing adjustment value if the uplink synchronization error occurs; and transmitting a bandwidth request code including the calculated timing adjustment value to a base station to request a bandwidth.

An exemplary code division multiplexing access (CDMA) allocation information element (CDMA_Allocation_IE) structure of an uplink MAP transmitted to a PSS from a base station for uplink synchronization in a mobile communication system according to another embodiment of the present invention includes a transmission opportunity, a timing adjustment, and a power adjustment. The transmission opportunity includes information on an interval of time when a particular PSS has the right to initiate data transmission through an uplink. The timing adjustment includes information on a timing adjustment value included in the bandwidth request code transmitted to the base station from the PSS for uplink synchronization. The power adjustment includes information on transmit power among the transmission parameters adjusted by the PSS.

An exemplary PSS according to another embodiment of the present invention performs uplink synchronization through a ranging process using a bandwidth request code in a mobile communication system. The PSS includes means for performing initial ranging with a base station and storing an initial timing value; means for determining whether uplink traffic is generated; means for determining whether an uplink synchronization error occurs when the uplink traffic is generated; means for calculating a timing adjustment value when the uplink synchronization error occurs; and means for transmitting a bandwidth request code including the calculated timing adjustment value to the base station and performing a bandwidth request.

BRIEF DESCRIPTION OF THE DRAWINGS

FIG. 7 shows a CDMA_Allocation_IE structure of an uplink MAP according to the exemplary embodiment of the present invention.

MODE FOR THE INVENTION

Figure 1:
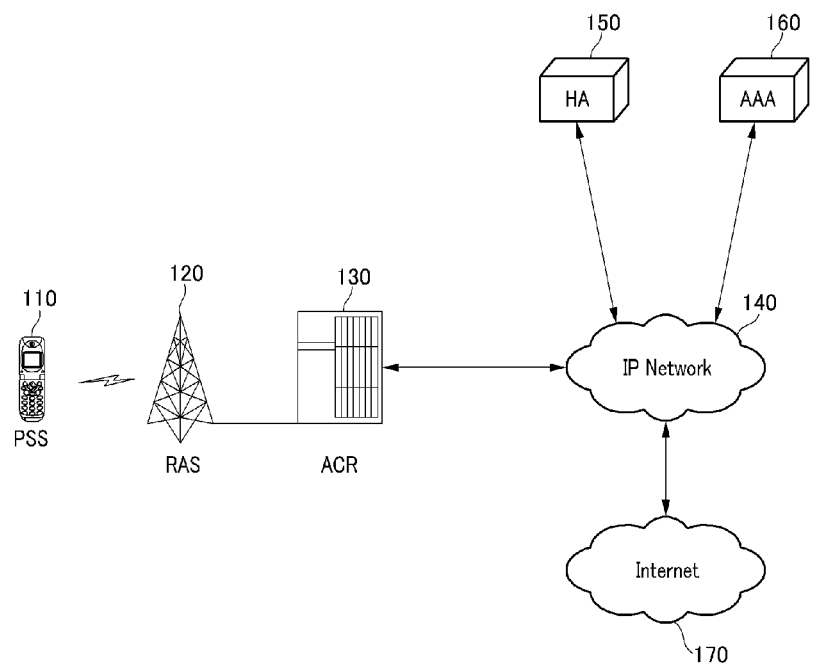
FIG. 1 is a schematic diagram of a mobile communication system.
Figure 2:
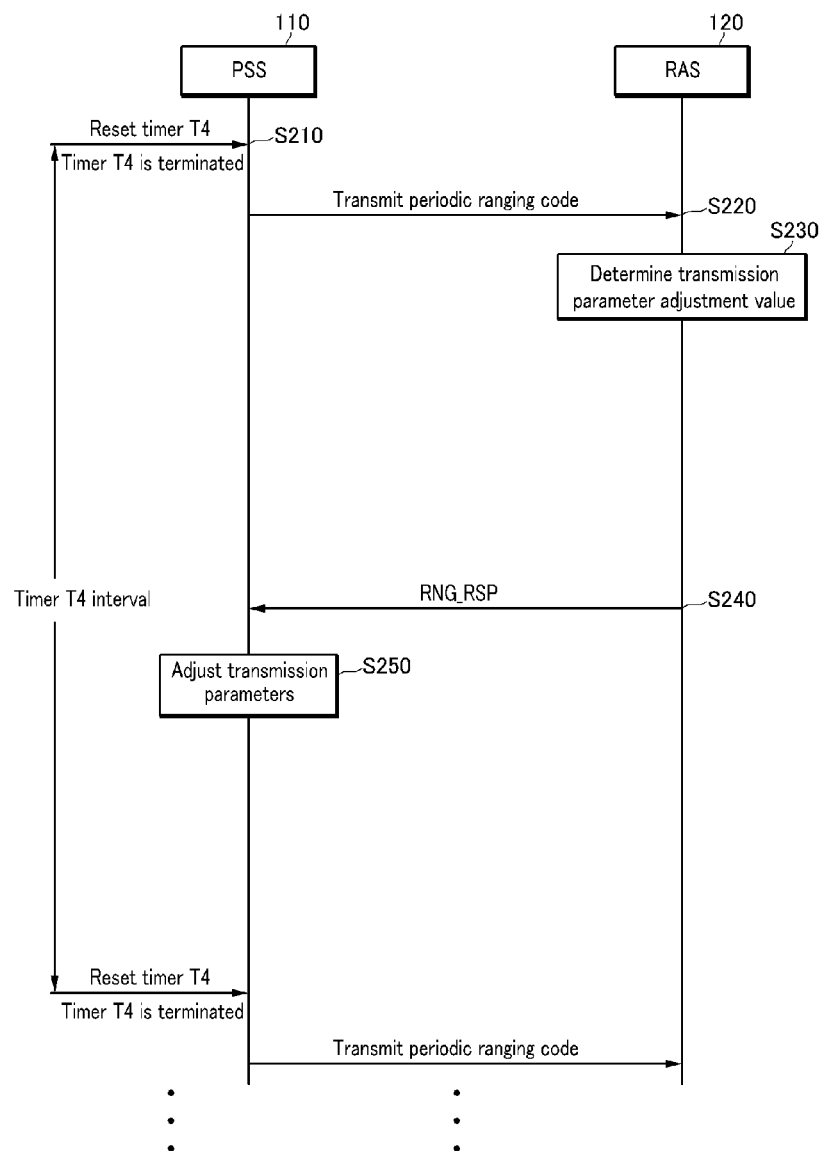
FIG. 2 is a signal flowchart for a periodic ranging process in the mobile communication system.
Figure 3:
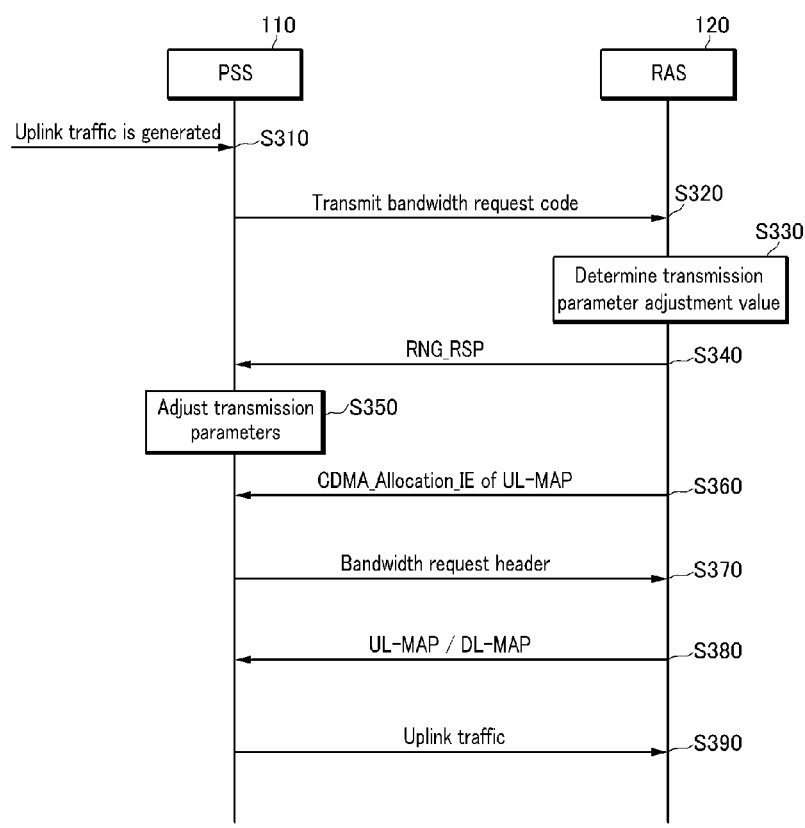
FIG. 3 is a signal flowchart of a bandwidth allocation and ranging process by a bandwidth request code in a wireless portable Internet system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements.

Figure 4:
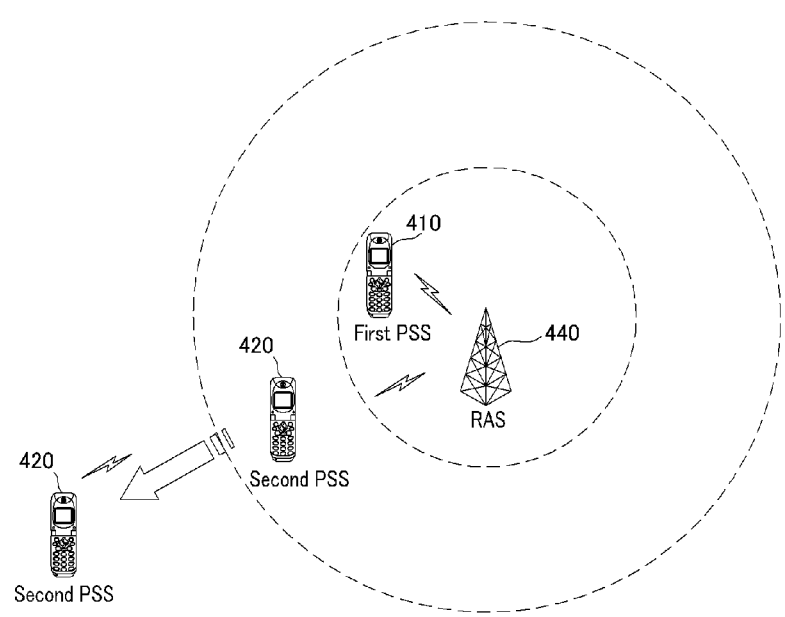
FIG. 4 shows a relationship between a PSS and an RAS in an uplink synchronization process of the PSS according to an exemplary embodiment of the present invention.
Figure 5:
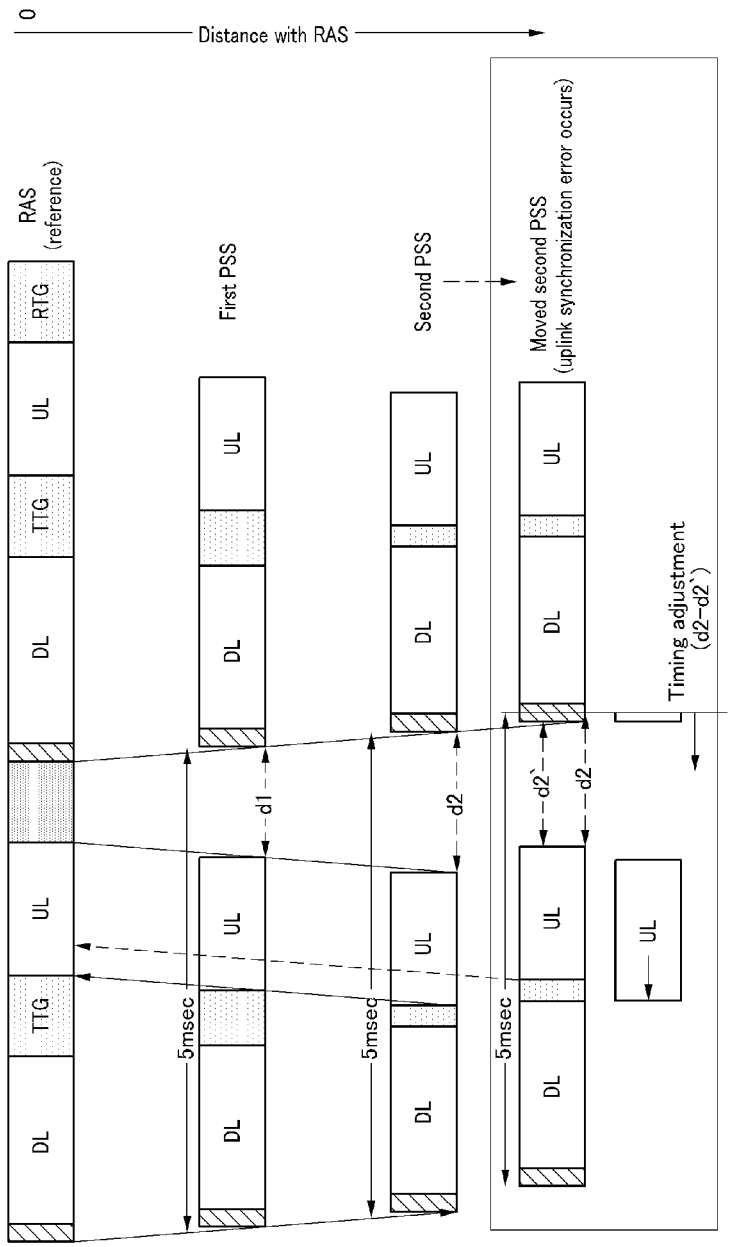
FIG. 5 schematically shows a principle of uplink synchronization in a PSS according to the exemplary embodiment of the present invention.

FIG. 4 shows a relationship between a portable subscriber station (PSS) and a radio access station (RAS) in an uplink synchronization process of the PSS according to an exemplary embodiment of the present invention, and FIG. 5 schematically shows a principle of uplink synchronization in a PSS according to the exemplary embodiment of the present invention.

In the present exemplary embodiment, the PSS is moving away from the RAS, but this is not restrictive. The PSS may move closer to the RAS.

It is illustrated in FIG. 5 that a downlink is notated as "DL" and an uplink is notated as "UL" for convenience of description.

As shown in FIG. 4, a first portable subscriber station (PSS) 410 and a second PSS 420 wirelessly communicate data with a radio access station (RAS) 440, and a distance between the first PSS 410 and the RAS 440 is less than a distance between the second PSS 420 and the RAS 440. In addition, the second PSS 420 is moving far away from the RAS 440.

As shown in FIG. 5, the second PSS 420 has a relatively large time delay since the distance between the second PSS 420 and the RAS 120 is greater than the distance between the first PSS 410 and the RAS 120, and therefore the second PSS 420 performs synchronization with the RAS 120 as a method for reducing a transmit transition gap (TTG) so that the second PSS 420 can receive an uplink frame faster than the first PSS 400.

In addition, the distance between the second PSS 420 and the RAS 440 increases as the second PSS 420 moves, and therefore a time delay (i.e., round trip delay) generated for data transmitting/receiving is increased. Accordingly, data transmission/receiving is delayed as the round trip delay increases due to movement of the second PSS 420.

That is, it is assumed that a time gap d2 between an arrival time of an uplink of the first frame and an arrival time of a downlink preamble of the second frame is set before the second PSS 420 moves and a time gap d2' between an arrival time of the uplink of the first received frame and the arrival of the downlink preamble of the second received frame is set after the second PSS 420 moves. When the time gaps d2 and d2' do not correspond to each other in this assumption, a synchronization error may occur in the second PSS 420 due to a time delay that corresponds to a difference between d2 and d2'.

Therefore, when the time gaps d2 and d2' do not correspond to each other, the second PSS 420 requests to reduce a frame transmission time by the difference (d2-d2') from the RAS 440 such that the synchronization error can be corrected. In this case, the different (d2-d2') becomes an initial timing adjustment value for adjusting synchronization of an uplink allocated from the RAS 440 to the second PSS 420.

Therefore, the second PSS 420 should store an initial timing adjustment value adjusted through an initial ranging process, and thus when a location of the second PSS 420 is changed, an arrival time of the downlink preamble of the second received frame is detected and compared with the initial timing adjustment value to determine whether the two values correspond to each other.

Figure 6:
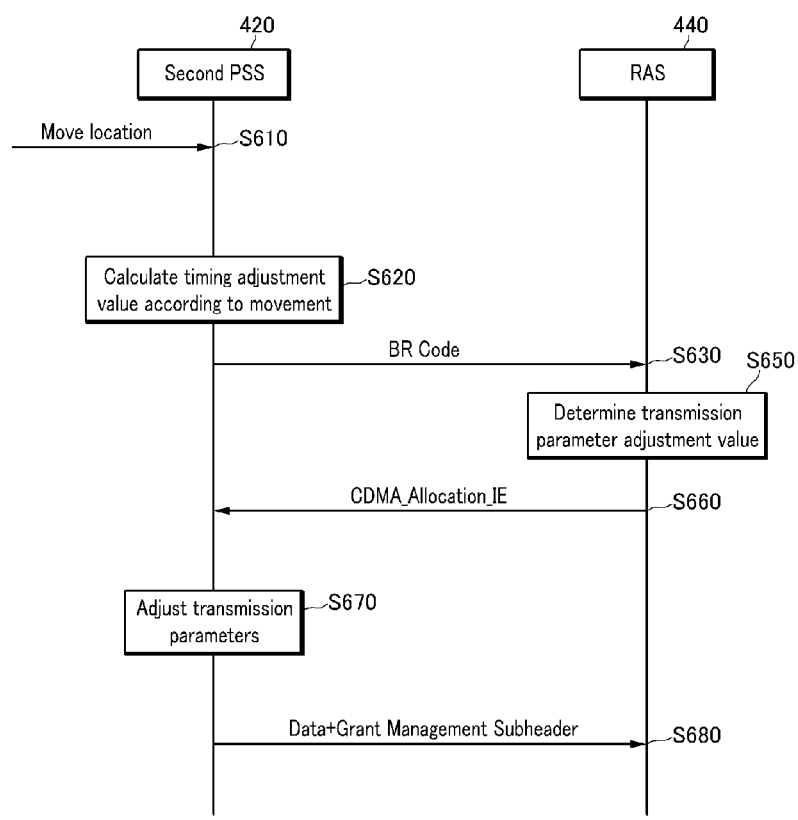
FIG. 6 shows a bandwidth request process using a bandwidth request code according to the exemplary embodiment of the present invention.

FIG. 6 shows a bandwidth request process using a bandwidth request code according to the exemplary embodiment of the present invention.

When the second PSS 420 moves close to or away from the RAS 440 in step S610, the second PSS 420 calculates a timing adjustment value according to the movement of the second PSS 420 by using the initial timing adjustment value adjusted through the initial ranging process and an arrival time of a data frame transmitted from the RAS 440, in step S620.

Subsequently, the second PSS 420 includes the timing adjustment value calculated in step S620 in a bandwidth request code (BR code) for uplink bandwidth allocation and transmits the BR code to the RAS 440, in step S630.

The RAS determines a transmission parameter adjustment value to be allocated to the second PSS 420 by using the received BR code in step S650, and it includes the determined transmission parameter adjustment value in a CDMA allocation information element (CDMA_Allocation_IE) and transmits the CDMA_Allocation_IE to the second PSS 420, in step S660. The CDMA_Allocation_IE is a message for bandwidth allocation for the uplink requested by the second PSS 420.

Herein, a structure of the CDMA_Allocation_IE according to the exemplary embodiment of the present invention will be described in further detail with reference to FIG. 7.

The second PSS 420 performs ranging to adjust transmission parameters (i.e., timing, transmit power, and frequency offset) by using the transmission parameter adjustment value included in the received CDMA_Allocation_IE, in step S670.

Then, the second PSS 420 transmits data through the uplink bandwidth allocated from the RAS 440, and requests an additional uplink bandwidth by transmitting a Grant_Management_Subheader message when the allocated uplink bandwidth is insufficient, in step S680.

As described, according to the exemplary embodiment of the present invention, when uplink traffic is generated in a PSS and thus the PSS determines that a synchronization error occurs due to movement of the PSS, the PSS transmits a timing adjustment value and a BR code to a RAS so as to correct the uplink synchronization error, rather than performing the periodic ranging. Herein, the timing adjustment value is calculated by the PSS.

FIG. 7 shows a CDMA_Allocation_IE structure of an uplink MAP according to the exemplary embodiment of the present invention.

A CDMA_Allocation_IE of an uplink MAP (UL MAP) according to the exemplary embodiment of the present invention further includes the transmission opportunity 730, the timing adjustment 740, and the power adjustment 750 in addition to a constituent element 710 of a conventional CDMA_Allocation_IE.

The constituent elements 710 of the conventional CDMA_Allocation_IE includes a duration 711 for indicating the number of allocated slots, an uplink interval usage code (UIUC) 712 for indicating a code used for an uplink, a repetition code indication 713 for indicating a repetition code used for allocated traffic, a frame number index 714 for indicating the number of frames to be used for uplink traffic transmission, a ranging code 715 for indicating a code, symbol, and a sub-channel for ranging, and a bandwidth (BW) request mandatory 716 for indicating a bandwidth request identifier.

The transmission opportunity 730 includes information on an interval of time when a particular PSS (i.e., the second PSS 420) has the right to initiate data transmission through an uplink.

The timing adjustment 740 includes information on a timing adjustment value included in a bandwidth request code transmitted to the RAS 440 for uplink synchronization from the second PSS 420 when a ranging process is performed.

The power adjustment 750 includes information on transmit power among transmission parameters adjusted by the second PSS 420 when the ranging process is performed.

Figure 8:
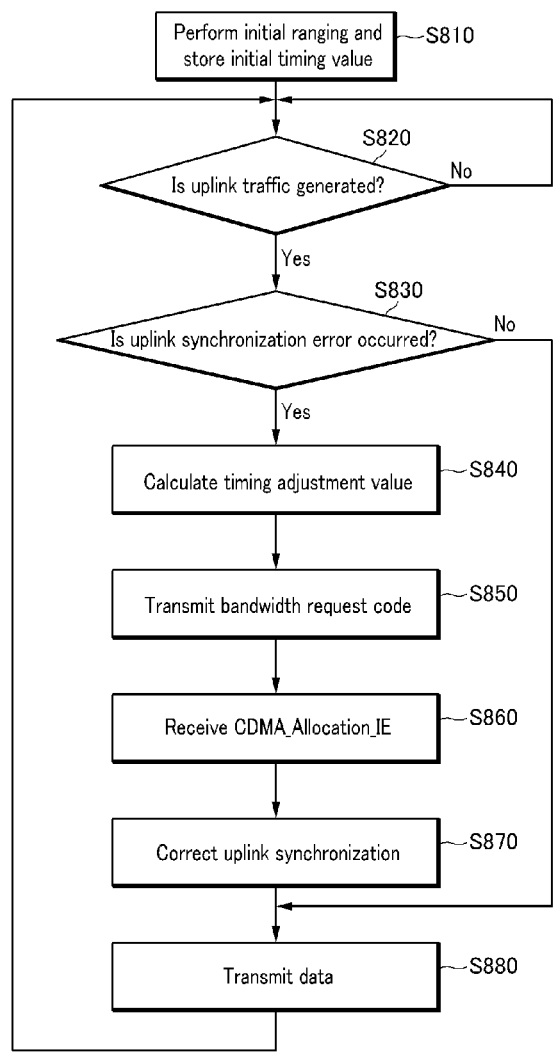
FIG. 8 is a schematic flowchart of an uplink synchronization process in the PSS according to the exemplary embodiment of the present invention.

FIG. 8 schematically shows an uplink synchronization process in a PSS according to the exemplary embodiment of the present invention.

The second PSS 420 performs an initial ranging process with the RAS 440, and stores an initial timing value set during the initial ranging process, in step S810.

Subsequently, the second PSS 420 determines whether uplink traffic is generated for data transmission through the RAS 440 in step S820, and determines whether an uplink synchronization error occurs when it is determined in step S820 that the uplink traffic was generated, in step S830.

When it is determined in step S830 that the uplink synchronization has error occurred, the second PSS 420 compares the initial timing value stored in step S810 and an arrival time of a downlink preamble of the second frame and calculates a timing adjustment value, in step S840.

Then, the second PSS 420 includes the timing adjustment value calculated in step S840 in a BW request code and transmits the BW request code to the RAS 440 in step S850, and receives a CDMA_Allocation_IE including the timing adjustment value from the RAS 440 in step S860.

The second PSS 420 corrects the uplink synchronization error with the RAS 440 by using information included in the received CDMA_Allocation_IE in step S870, and transmits data through a bandwidth allocated from the RAS 440 in step S880.

According to the exemplary embodiment of the present invention, an uplink synchronization error that occurs due to movement of a portable subscriber station after initial ranging can be corrected by comparing a reference adjustment value of a radio access station and an arrival time of a downlink preamble in the portable subscriber station.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

As described above, the portable subscriber station compares a reference adjustment value and an arrival time of a downlink preamble to calculate an uplink synchronization timing and synchronize an uplink of the portable subscriber station that requests bandwidth allocation through a bandwidth request ranging process to thereby maximize resource use efficiency in the uplink synchronization according to the exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a portable subscriber station to request uplink synchronization in a mobile communication system, the method comprising:
    performing initial ranging with a base station and storing an initial timing value;
    determining, by the portable subscriber station (PSS), whether an uplink synchronization timing error occurs if uplink traffic is generated;
    calculating, after moving, by the portable subscriber station, a timing adjustment value based on a difference between the initial timing value and an arrival time of a downlink preamble of a frame received from the base station without further ranging if the uplink synchronization error occurs; and
    transmitting, by the portable subscriber station, a bandwidth request code, including the calculated timing adjustment value, to a base station to request a bandwidth.

2. The method of claim 1, wherein the initial timing value corresponds to a time gap between an arrival time of an uplink of a first frame and an arrival time of a downlink preamble of a second received frame.

3. The method of claim 2, wherein the initial timing value corresponds to a reference adjustment value of a data frame for the base station to perform initial ranging with a plurality of portable subscriber stations (PSSs).

4. The method of claim 1, wherein the timing adjustment value corresponds to the difference between a time gap between an uplink arrival time of the n-th data frame and an arrival time of a downlink preamble of the (n+1)-th frame before the PSS moves, and a time gap between an uplink arrival of the n-th data frame and an arrival time of a downlink preamble of the (n+1)-th frame after the PSS moves (where n is a natural number).

5. The method of claim 1, wherein the method further comprises:
    receiving a code division multiplex access (CDMA) allocation information element from the base station;
    correcting uplink synchronization by using transmission parameter values included in the received CDMA allocation information element; and
    transmitting data to the base station by using a bandwidth allocated from the base station through the received CDMA allocation information element.

6. The method of claim 5, wherein the CDMA allocation information element including:
    a transmission opportunity data field including information on an interval of time when a particular PSS has the right to initiate data transmission through an uplink;
    a timing adjustment data field including information on a timing adjustment value included in the bandwidth request code transmitted to the base station from the PSS for uplink synchronization; and
    a power adjustment data field including information on transmit power among the transmission parameters adjusted by the PSS
    wherein the correcting of the uplink synchronization uses the information on the interval of time of the transmission opportunity field, uses the information on the timing adjustment value of the timing adjustment field and uses the information on the transmit power of the power adjustment field.

7. The method of claim 6, wherein correcting the uplink synchronization comprises correcting the uplink synchronization by using predetermined values in the transmission opportunity field and the timing adjustment field as the transmission parameter values.

8. The method of claim 6, wherein the CDMA allocation further includes:
    a duration for indicating the number of slots allocated to the PSS;
    an uplink interval usage (UIUC) for indicating a code used in the uplink;
    a repetition code indication for indicating a repetition code used for the uplink traffic;
    a frame number index for indicating the number of frames to be used for transmission of the uplink traffic;
    a ranging code for indicating a code, a symbol, and a sub-channel for the ranging; and
    a bandwidth (BW) request mandatory for indicating an identifier for the bandwidth request.

9. The method of claim 8, wherein receiving the CDMA allocation information element comprises receiving the CDMA allocation information element where the BW request mandatory included in the CDMA allocation information element is set to "0".

10. The method of claim 5, wherein the method further comprises requesting an additional uplink bandwidth by transmitting a Grant_Management_Subheader message to the base station when the bandwidth allocated from the base station is insufficient.

\* \* \* \* \*